(12) United States Patent
Kotlyarov

(10) Patent No.: US 10,216,185 B2
(45) Date of Patent: Feb. 26, 2019

(54) METHOD, SYSTEM, AND APPARATUS FOR CONTROLLING A PLURALITY OF MOBILE-RADIO EQUIPPED ROBOTS IN A TALKGROUP

(71) Applicant: MOTOROLA SOLUTIONS, INC, Chicago, IL (US)

(72) Inventor: Yury Vladimirovich Kotlyarov, Saint-Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/577,049

(22) PCT Filed: Sep. 11, 2015

(86) PCT No.: PCT/RU2015/000575
§ 371 (c)(1),
(2) Date: Nov. 27, 2017

(87) PCT Pub. No.: WO2017/043996
PCT Pub. Date: Mar. 16, 2017

(65) Prior Publication Data
US 2018/0203442 A1     Jul. 19, 2018

(51) Int. Cl.
*G05D 1/00* (2006.01)
*H04L 29/06* (2006.01)
(Continued)

(52) U.S. Cl.
CPC ......... *G05D 1/0027* (2013.01); *B64C 39/024* (2013.01); *G06F 3/167* (2013.01);
(Continued)

(58) Field of Classification Search
CPC .............. G05D 1/0027; H04L 65/4061; G08B 13/19658; H04W 4/90
(Continued)

(56) References Cited

U.S. PATENT DOCUMENTS 5,774,841 A * 6/1998 Salazar ................... G10L 15/22
704/225
6,584,376 B1 * 6/2003 Van Kommer ...... G05D 1/0022
379/88.03
(Continued)

FOREIGN PATENT DOCUMENTS

EP    2829936 A1    1/2015

OTHER PUBLICATIONS

The International Search Report and the Written Opinion, corresponding patent No. PCT/RU2015/000575, dated Sep. 11, 2015, all pages.

*Primary Examiner* — Isaac G Smith

(57) ABSTRACT

A process for controlling a plurality of mobile-radio equipped robots in a talkgroup includes receiving, at a mobile-radio equipped robot via a wireless communications interface comprising one of an infrastructure wireless communication interface for communicating with an infrastructure radio access network (RAN) and an ad-hoc wireless communication interface for communicating with an ad-hoc network, a group voice call containing a voice-command. The mobile-radio equipped robot determines that it is a target of the group voice call, and responsively text-converts the voice-command into an actionable text-based command. The mobile-radio equipped robot subsequently operates a mechanical drive element in accordance with the actionable text-based command.

20 Claims, 3 Drawing Sheets

(51) Int. Cl.
*G08B 13/196* (2006.01)
*H04W 4/10* (2009.01)
*H04W 4/40* (2018.01)
*B64C 39/02* (2006.01)
*G06F 3/16* (2006.01)
*H04W 4/90* (2018.01)

(52) U.S. Cl.
CPC ... *G08B 13/1966* (2013.01); *G08B 13/19689* (2013.01); *H04L 65/4061* (2013.01); *H04W 4/10* (2013.01); *H04W 4/40* (2018.02); *B64C 2201/123* (2013.01); *B64C 2201/127* (2013.01); *G08B 13/19645* (2013.01); *G08B 13/19656* (2013.01); *G08B 13/19658* (2013.01); *H04W 4/90* (2018.02)

(58) Field of Classification Search
USPC .................................................. 701/537, 539
See application file for complete search history.

(56) References Cited

U.S. PATENT DOCUMENTS

| | | |
|---|---|---|
| 8,214,088 B2 | 7/2012 | Lefebure |
| 8,751,061 B2 | 6/2014 | Coulmeau et al. |
| 2006/0167588 A1* | 7/2006 | Kong ................... G05D 1/0255 700/245 |
| 2015/0032260 A1 | 1/2015 | Yoon et al. |

* cited by examiner

METHOD, SYSTEM, AND APPARATUS FOR CONTROLLING A PLURALITY OF MOBILE-RADIO EQUIPPED ROBOTS IN A TALKGROUP

This application is a National Stage filing under 35 USC § 371 of co-pending Patent Cooperation Treaty international application having Serial No. PCT/RU2015/000575 (the 'PCT international application') filed on Sep. 11, 2015. This application claims priority to the PCT international application, the entire contents of which are incorporated herein by reference.

BACKGROUND OF THE INVENTION

People and organizations communicate wirelessly and on the go. Among the devices that make this possible are devices that are sometimes referred to as subscriber devices, mobile stations, or mobile radios. Examples of mobile radios include cell phones, smart phones, walkie-talkies, and portable hotspots, among others. A mobile radio could be handheld (as may be the case for a walkie-talkie), body-mounted, or attached to a vehicle (such as the roof of a car), as some examples.

Some users of mobile radios have specific requirements. For example, public-safety users may need push-to-talk (PTT) functionality, an officer-down alert, or direct mobile-to-mobile communication (for situations when, e.g., the mobile radios are out of range of a wireless infrastructure), among numerous other examples that could be listed here.

One feature often needed by public-safety users is group calling, which allows for communication among multiple mobile radios.

Another feature that is often needed by public-safety users is an 'eye-in-the-sky' or other robotic assistance, e.g., additional video and/or imaging coverage of an area of interest such as an incident scene or a robot that can traverse dangerous terrains or hazardous situations. In the past, a fixed camera installation may be controlled remotely by a user, such as a dispatch operator in a dispatch center, to tilt, pan, and/or zoom in a particular direction so that additional video and/or imaging intelligence could be gained through the media provided by the camera installation. Similarly, mobile mechanical rescue robots, mobile camera installations, or any other mobile-radio equipped electro-mechanical devices including but not limited to land or airborne vehicles (all hereinafter referred to simply as mobile-radio equipped robots), could be similarly manually controlled to move to an area of interest and subsequently control an accessory such as an attached camera installation to tilt, pan, and/or zoom in a particular direction so that additional video and/or imaging intelligence could be gained through the media provided by the camera installation. Such camera controls and land or airborne vehicle controls may be manually controlled, for example, using a joystick or other touch-based control input. However, when a plurality of mobile-radio equipped robots must be controlled in a synchronized manner to provide a coordinated response, it becomes very difficult and costly to control the plurality of mobile-radio equipped robots in a synchronized and controlled manner.

Accordingly, there is a need for methods and systems for improved control of a plurality of mobile-radio equipped robots.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
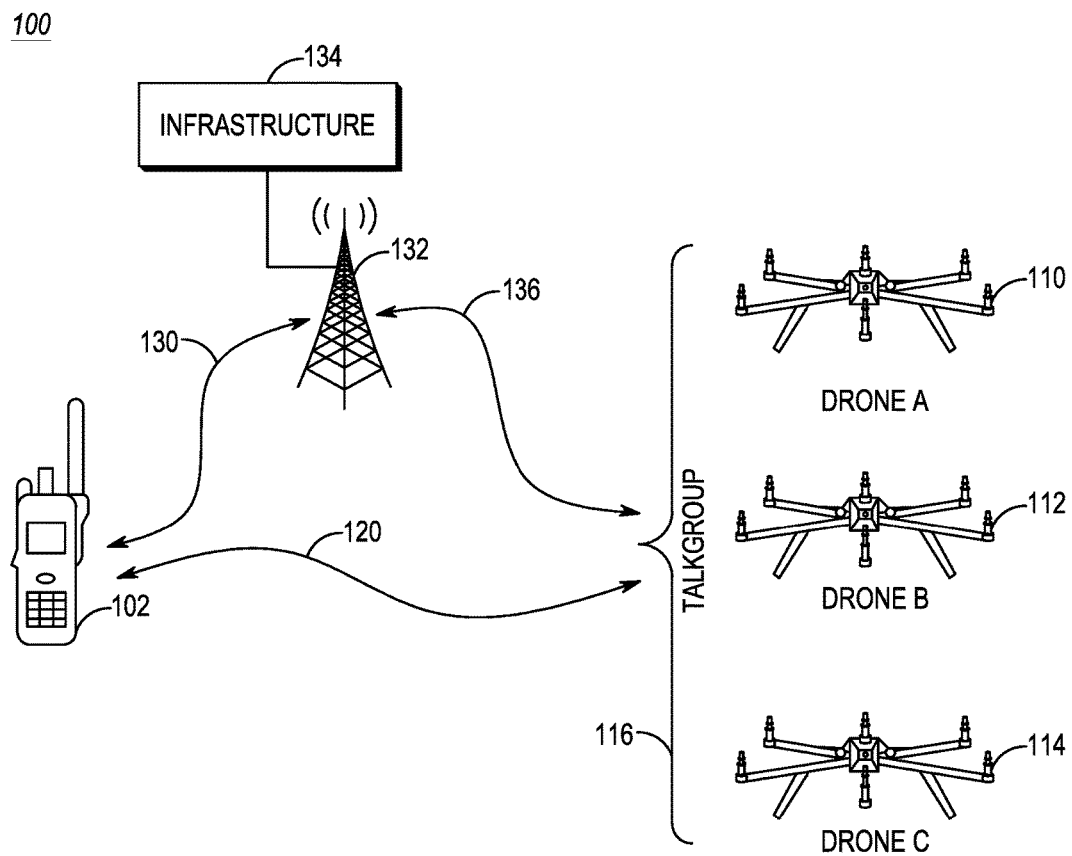
FIG. 1 depicts a communication system for controlling a plurality of mobile-radio equipped robots in a talkgroup, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are improved methods, systems, and apparatus for controlling a plurality of mobile-radio equipped robots in a talkgroup.

At least one embodiment takes the form of a mobile-radio equipped robot that is a member of a first talkgroup, comprising: a mechanical drive element; a wireless communications interface comprising one of an infrastructure wireless communication interface for communicating with an infrastructure radio access network (RAN) and an ad-hoc wireless communication interface for communicating with an ad-hoc network; a processor; and data storage containing instructions executable by the processor for causing the mobile-radio equipped robot to carry out a set of functions, the set of functions comprising: receiving, via the wireless communication interface, a group voice call containing a voice-command; determining that the mobile-radio equipped robot is a target of the group voice call, and responsively text-converting the voice-command into an actionable text-based command; and operating the mechanical drive element in accordance with the actionable text-based command.

Another embodiment takes the form of a method carried out by mobile-radio equipped robot that is a member of a first talkgroup, the method comprising: receiving, via a wireless communications interface comprising one of an infrastructure wireless communication interface for communicating with an infrastructure radio access network (RAN) and an ad-hoc wireless communication interface for communicating with an ad-hoc network, a group voice call containing a voice-command; determining that the mobile-radio equipped robot is a target of the group voice call, and responsively text-converting the voice-command into an actionable text-based command; and operating a mechanical drive element in accordance with the actionable text-based command.

Before proceeding with this detailed description, it is noted that the entities, connections, arrangements, and the like that are depicted in—and described in connection with—the above-mentioned various figures are presented by way of example only and not by way of limitation. As such, any and all statements or other indications as to what a particular figure depicts, what a particular element or entity in a particular figure represents or encompasses, and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in the following detailed description.

1. EXAMPLE NETWORK AND DEVICE STRUCTURES

FIG. 1 depicts a communication system for controlling a plurality of mobile-radio equipped robots in a talkgroup, in accordance with at least one embodiment. As shown, a communication system 100 includes a mobile radio (MR) 102, a plurality of mobile-radio equipped robots 110-114 that are members of a same talkgroup 116, a direct-mode wireless radio link 120, infrastructure supported wireless radio links 130, 136, base station (BS) 132, and infrastructure 134.

MRs 102 may be any MR configured to perform the mobile-radio functions described herein. MR 102 is a member of the same talkgroup 116 as the plurality of mobile-radio equipped robots 110-114, among other possible talkgroups. The MR 102 could take the form of a mobile phone, a smart phone, a tablet computer, and/or any combination of these, among numerous other possibilities. In addition to providing wireless-communication capabilities, the MR 102 may include a respective user interface (including elements such as a touch screen, keyboard, microphone, speakers, push-to-talk (PTT) key, and the like) with which a user such as an incident commander or dispatcher may interact with the respective MR 102. MR 102 includes a transceiver that, in cooperator with a microprocessor, allows the MR 102 to send and receive wireless communications with the talkgroup 116 via direct-mode wireless radio link 120 or infrastructure supported wireless radio links 130, 136.

Each of the plurality of mobile-radio equipped robots 110-114, while depicted in FIG. 1 as airborne drone vehicles, could additionally or alternatively be ground-based motor vehicles and/or camera installations with tilt, pan, and/or zoom capabilities, among many other possibilities. Each of the plurality of mobile-radio equipped robots 110-114 is a member of the same talkgroup 116 as the MR 102, among other possible talkgroups. Mobile-radio equipped robots 110-114 include a transceiver that, in cooperator with a microprocessor, allows the mobile-radio equipped robots 110-114 to send and receive wireless communications with the talkgroup 116 via direct-mode wireless radio link 120 or infrastructure supported wireless radio links 130, 136. A more detailed device structure for each of the mobile-radio equipped robots 110-114 will be described with respect to FIG. 2.

The talkgroup 116 may be defined by a particular identifier, (e.g., such that a source transmitter embeds an associated talkgroup identifier in each communication, and receiving devices including MR 102 and/or mobile-radio equipped robots 110-114 decode, execute, and/or playback communications that are embedded with the associated talkgroup identifier), may be associated with a particular conventional or trunked channel (e.g., such that a source transmitter selects a particular conventional or trunked channel associated or assigned to the talkgroup 116, and receiving devices including MR 102 and/or mobile-radio equipped robots 110-114 all move to the selected conventional or trunked channel and receive, decode, execute, and/or playback communications that are received over that associated or assigned conventional or trunked channel), or may be associated with a particular talkgroup session created by infrastructure 134 in response to a request for a new talkgroup session for talkgroup 116. Such associated or assigned talkgroup identifiers, channels, or sessions may be associated or assigned within the subscribed devices (including MR 102 and mobile-radio equipped robots 110-114) via a provisioning process prior to being put into service, via a user-interface of each respective device, or via over-the-air programming or signaling via BS 132 and infrastructure 134, among other options. While only one MR 102 and only three mobile-radio equipped robots 110-114 are illustrated in FIG. 1, in other embodiments, multiple MRs 102 may be provided as members of the talkgroup 116 for controlling the mobile-radio equipped robots 110-114, and two or more mobile-radio equipped robots, including tens or hundreds or robots, may be controlled by such one or more MRs 102.

For example, the MR 102 and mobile-radio equipped robots 110-114 may communicate via infrastructure supported wireless radio links 130, 136, BS 132, and infrastructure 134. While only a single wireless link 130 is illustrated between MR 102 and BS 132, in practice, there may be multiple wireless links between them, making up single or multiple traffic channels and/or single or multiple control or signaling channels. Similarly, while only a single wireless link 136 is illustrated between mobile-radio equipped robots 110-114 and BS 132, in practice, there may be multiple wireless links between them, making up single or multiple traffic channels and/or single or multiple control or signaling channels. Furthermore, in some examples the wireless links 130 and 136 may represent half-duplex or full-duplex channels shared between MR 102 and mobile-radio equipped robots 110-114.

Wireless radio links 130, 136, BS 132, and infrastructure 134 may form the basis of a narrowband (e.g., implementing the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI) or a broadband (e.g., implementing the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard) radio infrastructure system. BS 132 may be any fixed terminal, e.g. a base station, eNodeB, repeater, and/or access point, accessible to MR 102 and mobile-radio equipped robots 110-114. Although only one BS 132 is illustrated in FIG. 1 for ease of illustration, in other embodiments, multiple BSs may be distributed across a geographic region and communicably coupled via infrastructure 134.

In the case of narrowband infrastructure, infrastructure 134 may, for example, operate as a conventional radio infrastructure or a trunked radio infrastructure. In a conventional radio system, a plurality of MRs are formed into groups. Each group uses an associated channel (shared or separate) for communication. Thus, each group is associated with a corresponding channel, and each channel can only be used by one group at any particular moment in time. Channels may be divided by frequency, time, and/or code. In some systems, multiple groups may operate on the same channel, and may use a unique group ID embedded in the group communications to differentiate them. In a trunked radio system, MRs use a pool of channels for virtually an unlimited number of groups. Thus, all groups are served by all channels. For example, in a trunking system, all MRs operating at a radio site idle on an initial designated control channel or rest channel and when a new call is requested over the control or rest channel, is assigned a traffic channel for the new group call while remaining MRs not participating in the new group call stay on the initial designated control channel or rest channel. Other conventional and trunked configurations are possible as well.

The narrowband infrastructure 134 may include known sub-systems required for operation of an LMR RAN. Such sub-systems may include, for example, sub-systems providing authentication, routing, MR registration and location, system management and other operational functions within the LMR RAN. In some embodiments, a radio network controller (RNC), such as a zone controller (ZC), may provide for some or all of the authentication, routing, MR registration and location, system management and other operational functions for their corresponding zone. The LMR infrastructure 134 may additionally provide routes to other RAN infrastructures via one or more routers, switches, or gateways within the LMR infrastructure 210 and via IP network 290, and/or may provide access to other types of networks such as a plain old telephone system (POTS) network.

In the case of broadband infrastructure, infrastructure 134 may additionally or alternatively operate as a broadband radio infrastructure, such as an LTE system. BS 132 may thus operate as an LTE eNodeB, and may have radio links with a plurality of MRs including MR 102 and mobile-radio equipped robots 110-114. Communications sent over the LTE eNodeBs may be one of a varied number of communications types, including data, voice (including push to talk (PTT) over cellular (PoC), voice over IP (VoIP), or PTT over IP (PoIP), among others), audio, video, audio/video, or some other type of media, perhaps transmitted using one or more other voice or data protocols such as real-time transport protocol (RTP) or session initiation protocol (SIP). Group call distribution may be handled at the LTE infrastructure via repeated IP unicast transmissions, IP multicast transmissions, IP broadcast transmissions, or enhanced multicast broadcast multimedia service (MBMS), among other possibilities.

The LTE infrastructure 134 may include known subsystems required for operation of an LTE RAN. Such sub-systems may include, for example, sub-systems providing authentication, routing, MR registration and location, system management and other operational functions within the LTE RAN. For example, the LTE infrastructure 280 may include an evolved packet core which itself may include one or more devices including, for example, a serving gateway (S-GW), a mobile management entity (MME), a home subscriber server (HSS), a Policy and Charging Rules Function (PCRF), and a packet data network (PDN) gateway (P-GW). The S-GW may function to route and forward data packets, while also acting as a mobility anchor for the user data plane during inter-eNodeB handovers and as the anchor for mobility between LTE and other 3GPP technologies, among other possibilities. The MME may function to track and page idle MRs, authenticate MRs (via interactions with the HSS), enforce MR roaming restrictions, and handle security, key management, among other possibilities. The HSS may provide a central database that contains user-related and subscription-related information and may aid in MR system roaming, call and session establishment support, and user authentication and access authorization. The PCRF may function to provide charging and credit control for user data flows, and may provide for QoS assignments to user data flows. The P-GW may function to provide connectivity from the served MRs to external packet data networks (such as IP network 290 or a POTS network) by being the point of exit and entry of traffic for the MRs. The P-GW may also be involved in performing policy enforcement, packet filtering, and charging support. Fewer or more, and other types of, infrastructure devices may also be present and/or incorporated into the evolved packet core.

In addition to infrastructure wireless links 130, 136, MR 102 may additionally or alternatively maintain ad-hoc or direct-mode ("ad-hoc") wireless links 120 with the mobile-radio equipped robots 110-114 without any intervening infrastructure between them. For example, direct mode wireless link 120 may wirelessly couple MR 102 to one or more, or all, mobile-radio equipped robots 110-114. MR 102 and mobile-radio equipped robots 110-114 may communicative over direct mode wireless link 120 in accordance with one or more direct-mode air-interface protocols, such as Bluetooth, near field communication (NFC), Infrared Data Association (IrDA), ZigBee, direct-mode land-mobile-radio (LMR), direct mode LTE, and/or Wi-Fi, as long as the devices are within mutual transmission range of one another.

While in some embodiments, talkgroups are provisioned in MR 102 and mobile-radio equipped robots 110-114, in other embodiments, a controller device in infrastructure 134 may additionally track or have access to group subscription information such that, for each group identifier associated with a particular group of radios (e.g., talkgroup), can identify MRs (e.g., by hardware ID, hardware MAC address, IP address, radio ID, International Mobile Subscriber Identity (IMSI), a serial number, or some other unique identifier that can be used to identify subscribed member MRs) that are members of the particular group of MRs, and can provide updated group information over-the-air via infrastructure wireless links 130, 136.

Figure 2:
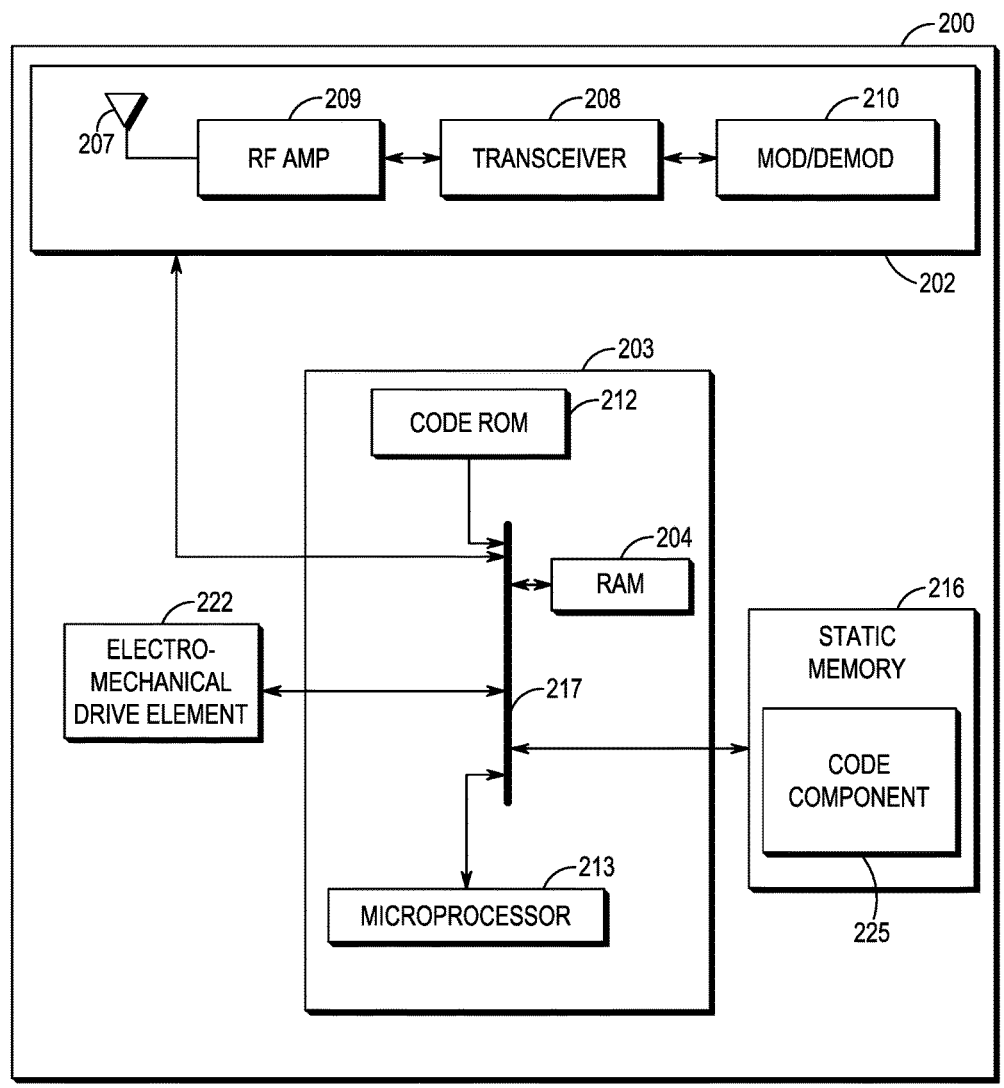
FIG. 2 depicts a block diagram of a mobile-radio equipped robot that is a member of a talkgroup of mobile-radio equipped robot, in accordance with at least one embodiment.

FIG. 2 depicts a mobile-radio equipped robot 200, in accordance with at least one embodiment. The mobile-radio equipped robot may be, for example, mobile-radio equipped robot 110 of FIG. 1. Mobile-radio equipped robots 112 and 114 may contain same or similar structures. As shown in FIG. 2, mobile-radio equipped robot 200 comprises a radio frequency communications unit 202, a static memory 216, and an electro-mechanical drive element 222, each coupled to a common data and address bus 217 of a processing unit 203.

The processing unit 203 may also include a code ROM 212 for storing data for initializing system components. The processing unit 203 may further include a microprocessor 213 coupled, by the common data and address bus 217, to a RAM 204 and the static memory 216 (i.e., data store).

The radio frequency communications unit 202 is a combined receiver (or receivers) and transmitter (or transmitters), e.g., transceiver(s) 208, having a common antenna 207. In some embodiments, additional separate or shared antennas may be provided for each one or more transmitter and/or receiver. The radio frequency communications unit 202 has the transceiver 208 coupled to the antenna 207 via a radio frequency amplifier 209. The transceiver(s) 208 may include a transceiver operating in accordance with one or more standard protocols, such as a DMR transceiver, a P25 transceiver, an LTE transceiver, a TETRA transceiver, an IEEE transceiver, a Bluetooth transceiver, a ZIGBEE transceiver, an NFC transceiver, and/or other type of wireless transceiver configurable to communicate via a wireless network. Other types of standards and protocols are possible as well. The transceiver 208 is also coupled to a combined modulator/demodulator 210.

An electro-mechanical drive element is coupled to the microprocessor 213 via the bus 217, and provides a mechanism to convert electrical signals into mechanical movement under control of the microprocessor 213. Such electro-mechanical drive elements my include a pan, tilt, zoom motor of a camera, a mechanical drive element for controlling movement of one or more flight rotors to control flight of an airborne vehicle, a mechanical drive element for controlling movement of one or more motor vehicles, etc.

Figure 3:
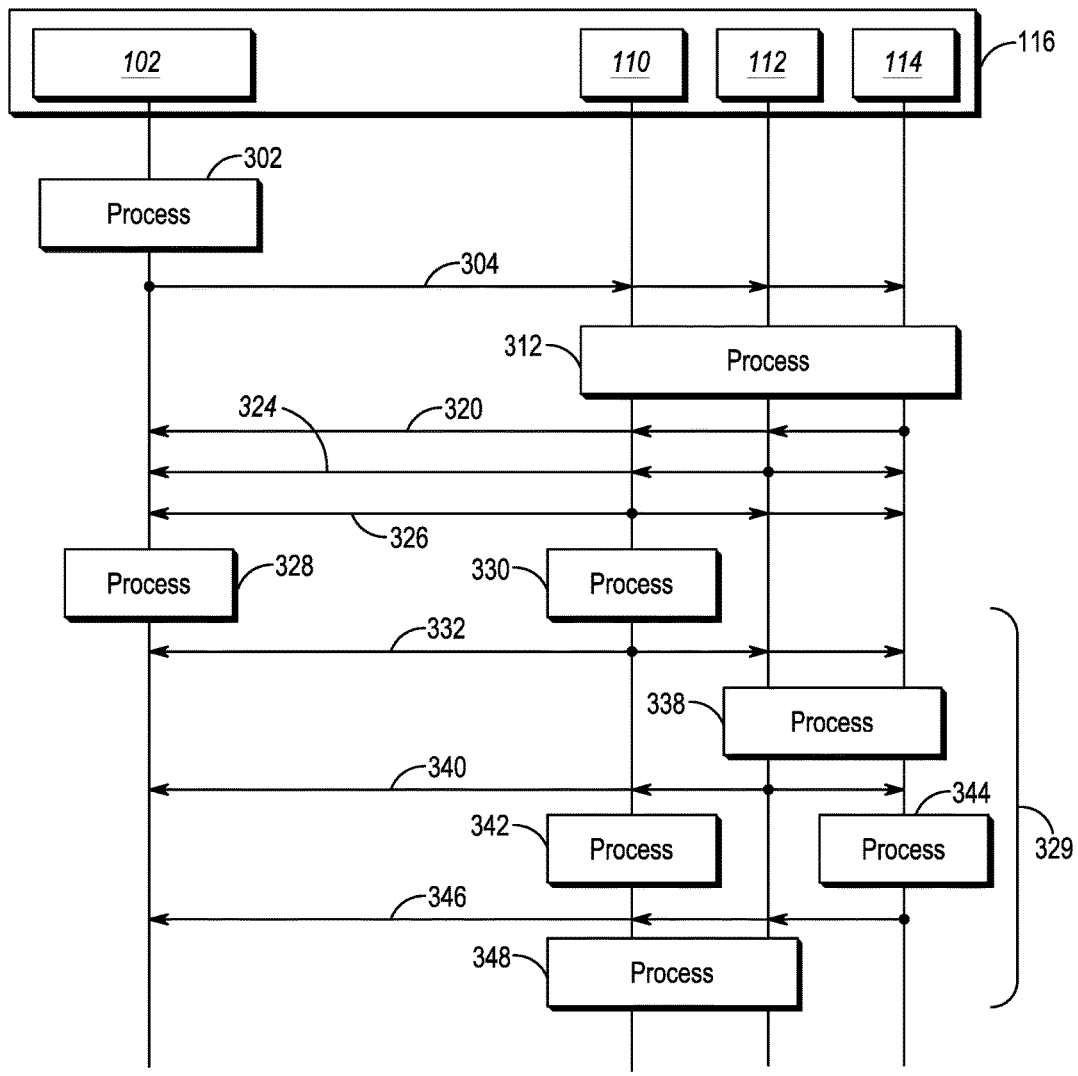
FIG. 3 depicts a ladder diagram illustrating processing steps and message transmissions and receptions for controlling a plurality of mobile-radio equipped robots in a talkgroup, in accordance with at least one embodiment.

In some embodiments of the present disclosure, the static memory 216 may store operating code 225 for the microprocessor 213 that, when executed by the microprocessor 213, perform one or more of the mobile-radio equipped robot processing, transmitting, and/or receiving steps set forth in FIG. 3 and accompanying text. Static memory 216 may comprise, for example, a Hard Disk Drive (HDD), an optical disk drives such as a compact disc (CD) drive or digital versatile disc (DVD) drive, a solid state drive (SSD), a tape drive, a flash memory drive, or a tape drive, to name a few.

2. PROCESSES FOR CONTROLLING A PLURALITY OF MOBILE-RADIO EQUIPPED ROBOTS IN A TALKGROUP

FIG. 3 depicts a ladder diagram 300 illustrating message transmissions, message receptions, and processing steps in a communication system, including MR 102 and mobile equipped robots 110-114, for controlling a plurality of mobile-radio equipped robots in a talkgroup. Mobile equipped robots 110-114 are illustrated in FIG. 3 as encompassed within a same talkgroup 116 as MR 102. Of course, additional processing steps, receptions, and/or transmissions not disclosed herein could be additionally added before, after, or in-between processing steps, receptions, and/or transmissions disclosed in FIG. 3, and the presence of such additional processing steps, receptions, and/or transmissions would not negate the purpose and advantages of the examples set forth in detail throughout the remainder of this disclosure. Furthermore, while a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure.

As shown, the ladder diagram 300 begins at processing step 302 with MR 102 detecting a request to transmit a command to a plurality of mobile-radio equipped robots 110-114 in talkgroup 116. The request to transmit the command may be received at MR 102 as a result of a detected activation of a push-to-talk button while a channel selection input is turned to a position associated with talkgroup 116, as a result of a detected selection of talkgroup 116 via a display screen and input element (touch, switch, button or otherwise) at MR 102, a detected voice command identifying the talkgroup 116 or some other parameter associated with the talkgroup 116 or mobile-radio equipped robots 110-114, or via some other action. For example, the talkgroup displayed on the phone (screen or knob) or the talkgroup identifier spoken into the phone by the user may be a textual identifier and may identify the types of mobile-radio equipped robots in the talkgroup 116, such as displaying a "drones" option, or "video" talkgroup identifier option.

At step 302, the mobile radio 102 processes the command, including requesting a traffic channel as necessary for talkgroup 116, switching to a particular conventional channel associated with talkgroup 116, and/or requesting a new talkgroup session for talkgroup 116. In those embodiments in which the MR 102 is utilizing infrastructure wireless links 130, 136 to reach the talkgroup 116, the request for a new channel or session may have to be transmitted to an infrastructure 134. In other embodiments in which the MR 102 utilizes a direct wireless link 120, it may simply switch to a preconfigured channel associated with talkgroup 116 and/or transmit a new call request to mobile-radio equipped robots 110-116 over a preconfigured reserved direct mode channel or via a dynamically determined direct mode channel. In any event, once the talkgroup call is setup, the MR 102 initiates a talkgroup voice call 304 to mobile-radio equipped robots 110-114.

The talkgroup voice call 304 may, again, be directly transmitted from MR 102 to mobile-radio equipped robots 110-114 via a broadcast or multicast transmission over direct wireless link 120 without any intervening infrastructure, or may be indirectly transmitted via infrastructure 134 and BS 132 to mobile-radio equipped robots 110-114 via separate infrastructure wireless link(s) 130, 136 (not shown in FIG. 3) via a similar broadcast or multicast transmission or via multiple unicast transmissions, depending on the infrastructure wireless protocol implemented.

At step 312, each mobile-radio equipped robot 110-114 receives the talkgroup voice call 304 and ensures that it is the intended recipient of the talkgroup voice call 304. Ensuring that it is the intended recipient of the talkgroup voice call 304 may include, for example, ensuring that it is on the pre-provisioned or dynamically provisioned channel associated with talkgroup 116, ensuring that a voice call header or embedded voice call signaling included in the voice call 116 includes a talkgroup identifier associated with talkgroup 116, and/or authenticating the source transmitting device (in this case, including MR 102) and/or the call 304 itself via information in the voice call 304 or via an additional handshake, key exchange, or challenge/answer transmission process (not shown in FIG. 3).

Once each mobile-radio equipped robot 110-114 determines that it is the intended recipient of the talkgroup voice call 304 and performs any other authentication function necessary, it begins voice-to-text converting the talkgroup voice call 304 and at least temporarily storing the text conversion in a memory such as RAM 204 of mobile-radio equipped robot 200.

Also at step 312, each mobile-radio equipped robot 110-114 may analyze the text conversion, parse the text conversion to identify commands/instructions, and then determine whether it can comply with the identified instruction. For example, mobile equipped robot 114 may identify an instruction to fly or move to a particular location in the text conversion, and may determine if it has sufficient remaining battery power to make it to the specified particular location. If so, it may transmit a response 320 to talkgroup 116 indicating a positive acknowledgment. The responsive talkgroup voice call 320 may be a voice call in response that uniquely identifies the transmitting device (e.g., "drone one") and recites a positive acknowledgment (e.g., "in flight" or "moving to location") or negative acknowledgment (e.g., "declined due to limited remaining power"). The responses may be stored in the mobile-radio equipped robot in digital audio form and played back according to a look-up table as a result of the mobile radio equipped robot's identification of instructions in the text conversion, or may be stored in the mobile-radio equipped robot in text form and text-to-voice converted on the fly during the responsive talkgroup voice call 320.

Still at step 312, mobile-radio equipped robot 112 may identify the instruction to fly or move to the particular location in the text conversion, and determine if it is currently executing any higher-priority instructions (e.g., from a higher priority source device or acting on a prior instruction set to a higher relative priority in its original instruction via talkgroup voice call 304). If not, it may transmit a response 324 to talkgroup 116 indicating a positive acknowledgment. The responsive talkgroup voice call 324 may be a voice call in response that uniquely identifies the transmitting device (e.g., "drone two") and recites a positive acknowledgment (e.g., "in flight" or "moving to location") or negative acknowledgment (e.g., "declined due to in-process instruction with higher priority").

Also still at step 312, mobile-radio equipped robot 110 may identify the instruction to fly or move to the particular location in the text conversion, and determine if it has equipment sufficient to meet equipment requirements set forth in the instruction (e.g., a visible light camera, an infrared camera, a shot-spotter gunshot detector, a flood light, a mobile base station, etc.). If so, it may transmit a response 324 to talkgroup 116 indicating a positive acknowledgment. The responsive talkgroup voice call 324 may be a voice call in response that uniquely identifies the transmitting device (e.g., "drone three") and recites a positive acknowledgment (e.g., "in flight" or "moving to location") or negative acknowledgment (e.g., "declined due lack of corresponding equipment").

At step 328, the MR 102 receives the responses 320, 324, 326 from mobile-radio equipped robots 110-114 via talkgroup 116. The MR 102 may playback the voice from the talkgroup voice calls 320-326, and/or may text-convert the talkgroup voice calls, analyze the text conversion, and display a summary of the responses, including for example, an identity of each mobile-radio equipped robot and whether that mobile-radio equipped robot has accepted or rejected the instruction (and if rejected, perhaps for what reason).

In addition to receiving and executing voice commands provided to the talkgroup 116, each mobile-radio equipped robot 110-114 may also provide additional capabilities to coordinate their response to the command from the talkgroup voice call 304 via a coordination process 329. The coordination process 329 may, for example, help to prevent mobile-radio equipped robots such as airborne drones or movable motor vehicle robots from interfering with one another's execution of the same command sent to all of the mobile-radio equipped robot 110-114 via the talkgroup, such as all robots arriving at a same exact indicated destination and colliding. More specifically, in response to receiving a command and detecting that the command was sent via a talkgroup voice call 304 to a talkgroup 116, each mobile-radio equipped robot 110-114 may execute a coordination function 329 amongst themselves to avoid such potentially disastrous results.

As illustrated in FIG. 3, for example, mobile-radio equipped robot 110 may detect at step 312 that it can act on the provided command from talkgroup voice call 304 and transmits the positive acknowledgment via talkgroup voice call 326. At step 330, it detects that it can execute the command and that the command was provided to talkgroup 116 via talkgroup voice call 304, and thus likely includes other mobile-radio equipped robots executing the same command, and responsively executes a coordination function. The coordination function may be provisioned into each mobile-radio equipped robot 110-114 and may change depending on a function of the mobile-radio equipped robot. For example, where the mobile-radio equipped robot 110 is an airborne drone, and the mobile-radio equipped robot 110 received a voice instruction in the voice call 304 to fly to a particular location, the mobile-radio equipped robot 110 may take the particular location provided in the talkgroup voice call 304 and offset the destination location in one or more of longitude, latitude, or elevation, and proceed to the calculated offset destination location instead of the destination location provided in the talkgroup voice call 304. The amount of offset applied by the mobile-radio equipped robot 110 may be pre-provisioned in the robot 110, and may equate to, for example, single or tens of degrees, minutes, or seconds in latitude or longitude, single or tens or hundreds of meters ground distance, and/or single or tens or hundreds of meters distance in elevation.

The mobile-radio equipped robot 110 may then provide its determined and applied offset to the talkgroup 116 via talkgroup voice call 332 to ensure that other mobile-radio equipped robots 112, 114 implement sufficiently different offsets to avoid a collision. At step 338, the mobile-radio equipped robots 112, 114 receive the talkgroup voice call 332 including the offset, text-convert the talkgroup voice call 332 to text, and begin calculating their own offsets. For example, at step 338, mobile-radio equipped robot 112 determines its own offset to avoid mobile-radio equipped robot 110, and provides its own calculated offset to mobile-radio equipped robots 110 and 114 via talkgroup voice call 340.

At step 342, mobile-radio equipped robot 110 may text-convert the talkgroup voice call 340 and either discard the information (as it already sent out its own offset), or review the provided offset and ensure it does not conflict with the offset it provided in talkgroup voice call 332. If it does conflict, it may notify the corresponding mobile-radio equipped robot of the conflict.

At step 344, mobile-radio equipped robot 114 may text-convert the talkgroup voice call 340 and, in view of both offsets received in talkgroup voice calls 332 and 340, calculate its own offset at step 344 and provide it to mobile-radio equipped robots 110 and 112 via talkgroup voice call 346.

At step 348, mobile-radio equipped robots 110 and 112 may text-convert the talkgroup voice call 346 and either discard the information (as each already sent out its own offset), or review the provided offset and ensure it does not conflict with the offset it provided in voice calls 332 and 340, receptively. If it does conflict, the robot may notify the corresponding mobile-radio equipped robot of the conflict.

MR 102 also receives each of the talkgroup voice calls 332, 340, and 346, and may similarly play back the voice setting forth the offsets, and/or may text-convert the voice and display the text-converted offsets for review via a display to an operator of the MR 102.

In some embodiments, coordination process 329 may take place via a secondary network instead of via talkgroup 116.

For example, the mobile-radio equipped robots 110-114 may use the transceiver 208 or a second transceiver in addition to the transceiver 208 (such as a shorter-range transceiver relative to the transceiver 208) to execute the coordination process 329. As a result, the mobile-radio equipped robots 110-114 could more quickly exchange short data messages including threshold variations in coordinating a response in view of the talkgroup voice call 304. The coordination process 329 may take place via a secondary network such as via direct mode wireless link 120 when the initial talkgroup voice call 304 was provided via infrastructure links 130, 136, in accordance with one or more direct-mode air-interface protocols, such as Bluetooth, near field communication (NFC), Infrared Data Association (IrDA), ZigBee, direct-mode land-mobile-radio (LMR), direct mode LTE, and/or Wi-Fi, as long as the devices are within mutual transmission range of one another. In other embodiments, the coordination process 329 may take place via the primary network over which the talkgroup voice call 304 was provided, but may do so using data transmissions instead of the voice call and text conversion processes set forth in FIG. 3. Other examples are possible as well.

Although the example above discusses a coordination function with respect to an airborne or motor vehicle electro-mechanical drive element, in other examples where the electro-mechanical drive element is, for example, an imaging device such as a still image camera or video camera, the coordination function may function to coordinate imaging of an entire scene so that each of the mobile-radio equipped robots 110-114 captures an image or video of a defined location set forth in talkgroup voice call 304 via a different angle, so that the images or videos can be stitched together to form a cohesive whole, or so that the images or videos provide different zoom levels, etc. Other examples of coordination amongst other types of robots having other types of electro-mechanical drive elements could be implemented as well.

Furthermore, and in some embodiments, the mobile-radio equipped robots 110-114 may include both a first electro-mechanical drive element such as an airborne or motor vehicle electro-mechanical drive element and a second electro-mechanical drive element such as a pan, zoom, tilt camera electro-mechanical drive element, and the talkgroup voice call 304 may specify separate instructions for each of the two or more electro-mechanical drive elements. The receiving mobile-radio equipped robots 110-114 would then parse the text-converted instructions into separate instructions for each respective electro-mechanical drive element, and control each electro-mechanical drive element to execute the provided text-converted instructions. In some embodiments, separate coordination functions 329 could be executed for each separate type of electro-mechanical drive element instruction, e.g., one coordination function 329 for the flight instruction, and another coordination function 329 for the imaging instruction. Other combinations are possible as well.

3. CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile-radio equipped robot that is a member of a first talkgroup, the first mobile-radio equipped robot comprising:
    a mechanical drive element;
    a wireless communications interface comprising one of an infrastructure wireless communication interface for communicating with an infrastructure radio access network (RAN) and an ad-hoc wireless communication interface for communicating with an ad-hoc network;
    a processor; and
    data storage containing instructions executable by the processor for causing the mobile-radio equipped robot to carry out a set of functions, the set of functions comprising:
        receiving, via the wireless communication interface, a group voice call containing a voice-command;
        determining that the mobile-radio equipped robot is a target of the group voice call, and responsively text-converting the voice-command into an actionable text-based command; and
        operating the mechanical drive element in accordance with the actionable text-based command.

2. The mobile-radio equipped robot or claim 1, the set of functions further comprising, prior to operating the mechanical drive element in accordance with the actionable text-based command, authenticating one or both of the group voice call and a source communication device of the group voice call.

3. The mobile-radio equipped robot of claim 1, the set of functions further comprising:
    after or while operating the mechanical drive element in accordance with the actionable text-based command, text to voice converting an acknowledgment message acknowledging the voice command and transmitting, via the wireless communication interface, the voice-converted acknowledgment to the first talkgroup.

4. The mobile-radio equipped robot of claim 1, the set of functions further comprising:
    coordinating execution of the actionable text-based command with a plurality of second mobile-radio equipped robots also joined to the first talkgroup, via communications transmitted over one of the group call over the wireless communication interface and a second short-range wireless communication interface, and operating the mechanical drive element in accordance with the actionable text-based command and the coordinated execution.

5. The mobile-radio equipped robot of claim 4, wherein coordinating execution of the actionable text-based command is performed via the second short-range wireless communication interface, the second short-range wireless communication interface comprising one of a direct-mode land-mobile-radio (LMR), Bluetooth, Zigbee, near-field communication (NFC), and IEEE 802.11 wireless interface.

6. The mobile-radio equipped robot of claim 1, wherein the wireless communications interface comprises the infrastructure wireless communication interface and the group call is received over the infrastructure wireless communication interface, the mobile-radio equipped robot determining that the mobile-radio equipped robot is a target of the group voice call by tuning to one of a conventional radio channel and a trunked traffic radio channel assigned to a talkgroup to which the group call is directed.

7. The mobile-radio equipped robot of claim 6, wherein the one of the conventional radio channel and trunked traffic radio channel is an FDMA or TDMA channel assigned to the mobile-radio equipped robot via a provisioning process or an over-the-air signaling process.

8. The mobile-radio equipped robot of claim 1, wherein the wireless communications interface comprises the infrastructure wireless communication interface and the group call is received over the infrastructure wireless communication interface, the mobile-radio equipped robot determining that the mobile-radio equipped robot is a target of the group voice call by receiving a broadcast call header message containing a talkgroup identifier, comparing the received talkgroup identifier to a provisioned or over-the-air signaled talkgroup identifier identifying the first talkgroup, and finding a match between the received talkgroup identifier and the provisioned or over-the-air signaled talkgroup identifier identifying the first talkgroup.

9. The mobile-radio equipped robot of claim 8, wherein the wireless communications interface comprises the infrastructure wireless communication interface and the infrastructure wireless communication interface is a broadband wireless interface.

10. The mobile-radio equipped robot of claim 1, wherein operating the mechanical drive element in accordance with the actionable text-based command comprises operating a pan, tilt, zoom motor of a camera, recording and encoding one or more of imagery and video via the camera, and transmitting the recorded and encoded one or more of imagery and video to the first talkgroup.

11. The mobile-radio equipped robot of claim of claim 10, further comprising coordinating operation of the pant, tilt, zoom motor with a plurality of second mobile-radio equipped robots also joined to the first talkgroup, via communications transmitted over one of the group call over the wireless communication interface and a second short-range wireless communication interface, to capture differing viewpoints or zoom levels of the destination indicated in the voice command.

12. The mobile-radio equipped robot of claim of claim 1, wherein operating the mechanical drive element in accordance with the actionable text-based command comprises operating a plurality of flight rotors to cause the mobile-radio equipped robot to fly along a flight path towards a destination indicated in the voice-command.

13. The mobile-radio equipped robot of claim of claim 12, further comprising coordinating, via communications transmitted over one of the group call over the wireless communication interface and a second short-range wireless communication interface, threshold variations to the flight path to the destination indicated in the voice-command with a plurality of second mobile-radio equipped robots also joined to the first talkgroup and also flying along the flight path towards the destination indicated in the voice-command in order to avoid a collision.

14. A method carried out by mobile-radio equipped robot that is a member of a first talkgroup, the method comprising:
receiving, via a wireless communications interface comprising one of an infrastructure wireless communication interface for communicating with an infrastructure radio access network (RAN) and an ad-hoc wireless communication interface for communicating with an ad-hoc network, a group voice call containing a voice-command;
determining that the mobile-radio equipped robot is a target of the group voice call, and responsively text-converting the voice-command into an actionable text-based command; and
operating a mechanical drive element in accordance with the actionable text-based command.

15. The method of claim 14, further comprising, prior to operating the mechanical drive element in accordance with the actionable text-based command, authenticating one or both of the group voice call and a source communication device of the group voice call.

16. The method of claim 14, further comprising: after or while operating the mechanical drive element in accordance with the actionable text-based command, text to voice converting an acknowledgment message acknowledging the voice command and transmitting, via the wireless communication interface, the voice-converted acknowledgment to the first talkgroup.

17. The method of claim 14, further comprising coordinating execution of the actionable text-based command with a plurality of second mobile-radio equipped robots also joined to the first talkgroup, via communications transmitted over one of the group call over the wireless communication interface and a second short-range wireless communication interface, and operating the mechanical drive element in accordance with the actionable text-based command and the coordinated execution.

18. The method of claim 14, wherein the wireless communications interface comprises the infrastructure wireless communication interface and the group call is received over the infrastructure wireless communication interface, the mobile-radio equipped robot determining that the mobile-radio equipped robot is a target of the group voice call by tuning to one of a conventional radio channel and a trunked traffic radio channel assigned to a talkgroup to which the group call is directed.

19. The method of claim 14, wherein the wireless communications interface comprises the infrastructure wireless communication interface and the group call is received over the infrastructure wireless communication interface, the mobile-radio equipped robot determining that the mobile-radio equipped robot is a target of the group voice call by receiving a broadcast call header message containing a talkgroup identifier, comparing the received talkgroup identifier to a provisioned or over-the-air signaled talkgroup identifier identifying the first talkgroup, and finding a match between the received talkgroup identifier and the provisioned or over-the-air signaled talkgroup identifier identifying the first talkgroup.

20. The method of claim 14, wherein operating the mechanical drive element in accordance with the actionable text-based command comprises one of: (i) operating a pan, tilt, zoom motor of a camera, recording and encoding one or more of imagery and video via the camera, and transmitting the recorded and encoded one or more of imagery and video to the first talkgroup or via a secondary network, and (ii) operating a plurality of flight rotors to cause the mobile-radio equipped robot to fly along a flight path towards a destination indicated in the voice-command.

* * * * *